United States Patent
An

(10) Patent No.: US 9,783,023 B2
(45) Date of Patent: Oct. 10, 2017

(54) PROCESSING UNIT FOR VEHICLE AIR CONDITIONER WARNING, WARNING DEVICE AND WARNING METHOD

(71) Applicant: Bosch Automotive Products (Suzhou) Co., Ltd., Suzhou, Jiangsu (CN)

(72) Inventor: Jian An, Jiangsu (CN)

(73) Assignee: Bosch Automotive Products (Suzhou) Co., Ltd., Suzhou, Jiangsu (CN)

( * ) Notice: Subject to any disclaimer, the term of this patent is extended or adjusted under 35 U.S.C. 154(b) by 0 days.

(21) Appl. No.: 14/959,110

(22) Filed: Dec. 4, 2015

(65) Prior Publication Data

US 2016/0159201 A1 Jun. 9, 2016

(30) Foreign Application Priority Data

Dec. 8, 2014 (CN) .......................... 2014 1 0740692

(51) Int. Cl.
*B60Q 1/00* (2006.01)
*B60H 1/00* (2006.01)

(52) U.S. Cl.
CPC ......... *B60H 1/00978* (2013.01); *B60H 1/008* (2013.01); *B60H 1/00771* (2013.01); *B60H 1/00778* (2013.01); *B60H 1/00985* (2013.01)

(58) Field of Classification Search
CPC ....................... B60H 1/00771; B60H 1/00778; B60H 1/008; B60H 1/00978; B60H 1/00985; F24F 11/0009; F24F 2011/0091; F24F 11/0012; F24F 11/0078; F24F 11/02; F24F 13/222; F24F 1/0007; F24F 1/025; F24F 2011/00

USPC ......... 340/438, 903, 461, 572.1, 573.1, 988, 340/990, 466, 467, 539.22, 539.26
See application file for complete search history.

(56) References Cited

U.S. PATENT DOCUMENTS 5,430,656 A * 7/1995 Dekel .................. G01S 5/0009
342/357.25
2006/0061484 A1 * 3/2006 Gutting ................. G08G 1/161
340/903

(Continued)

FOREIGN PATENT DOCUMENTS

| DE | 110320745 A1 | 12/2004 |
|---|---|---|
| DE | 102004002584 A1 | 8/2005 |
| EP | 1302746 A1 | 4/2003 |

*Primary Examiner* — Daniel Previl
(74) *Attorney, Agent, or Firm* — Maginot, Moore & Beck LLP

(57) ABSTRACT

A processing unit, method, and device for vehicle air conditioner warning are disclosed. The processing unit is configured to judge a ventilation state of the current vehicle location based on positioning satellite signals, to judge an operation state of the vehicle engine based on information, to judge a running state of the vehicle based on information received, to judge a using state of the air conditioner based on information, to judge a vehicle door/window opening/closing state based on information, and to determine that there is a potential risk of poisoning and initiate the warning element when all the following conditions are met: the ventilation state at the current vehicle location is bad, the engine is in operation, the vehicle is in a stopped state or runs at a low speed, the air conditioner is being used, and all the doors and windows of the vehicle are closed.

10 Claims, 2 Drawing Sheets

(56) References Cited

U.S. PATENT DOCUMENTS

| | | | | |
|---|---|---|---|---|
| 2009/0015203 A1* | 1/2009 | Oakes | .................... | G06Q 40/00 320/132 |
| 2009/0146813 A1* | 6/2009 | Nuno | ..................... | G08B 21/22 340/572.1 |
| 2011/0006892 A1* | 1/2011 | Karpinsky | ............. | B60K 35/00 340/461 |
| 2012/0310547 A1* | 12/2012 | Cristoforo | .............. | G08B 21/14 702/24 |

* cited by examiner

PROCESSING UNIT FOR VEHICLE AIR CONDITIONER WARNING, WARNING DEVICE AND WARNING METHOD

This application claims priority under 35 U.S.C. §119 to patent application no. CN 201410740692.3 filed on Aug. 12, 2014 in China, the disclosure of which is incorporated herein by reference in its entirety.

TECHNICAL FIELD

The disclosure relates to a processing unit for vehicle air conditioner warning and a corresponding warning device and warning method.

BACKGROUND ART

During the normal running of a vehicle, the amount of carbon oxide in the discharged exhaust is small since the speed of the engine is relatively high. However, when the engine runs at an idle speed when the vehicle is stopped, exhaust containing a large amount of carbon oxide is discharged because of incomplete combustion of the fuel. Thus, if the engine is in the idle state when the vehicle is stopped while the air conditioner still runs, carbon oxide will be drawn into and gathered in the vehicle cabin gradually, so persons in the vehicle cabin may be poisoned unconsciously to loss awareness, or even loss life in serious conditions.

In order to avoid such carbon oxide poisoning, various in-vehicle carbon oxide sensing and warning solutions have been developed according to prior art. These solutions, however, are generally based on sensing the concentration of in-vehicle carbon oxide by using carbon oxide sensing devices, and a warning is sent out when the concentration of carbon oxide exceeds a certain level.

According to this type of prior art, carbon oxide sensing devices need to be added, which results in higher cost of the vehicle. In addition, the life time of carbon oxide sensing devices is short, for example, only about one or two years for a general carbon oxide sensor, so updating in-vehicle carbon oxide sensing devices is a nuisance; and, on the other hand, long life carbon oxide sensing devices are accompanied by higher cost.

SUMMARY OF INVENTION

The disclosure is aimed at providing an improved solution for warning of a potential risk when the vehicle air conditioner is being used.

For this end, the disclosure provides in one aspect a processing unit for vehicle air conditioner warning, the processing unit being connected with a satellite signal receiving element and a warning element and comprising or being connected with an engine operation state acquisition module, a vehicle running state acquisition module, an air conditioner operation state acquisition module and a door/window opening/closing state acquisition module (that is to say, these modules may form a portion of the processing unit, or be separate elements that can be connected to the processing unit). The processing unit is configured to judge a ventilation state of the current vehicle location based on positioning satellite signals received by the satellite signal receiving element, to judge an operation state of the vehicle engine based on information received by the engine operation state acquisition module, to judge a running state of the vehicle based on information received by the vehicle running state acquisition module, to judge a using state of the air conditioner based on information received by the air conditioner operation state acquisition module, to judge a vehicle door/window opening/closing state based on information received by the door/window opening/closing state acquisition module, and to determine that there is a potential risk of poisoning when the air conditioner is being used and initiate the warning element when all the following conditions are met: the ventilation state at the current vehicle location is bad, the engine is in operation, the vehicle is in a stopped state or runs at a low speed, the air conditioner is being used, and all the doors and windows of the vehicle are closed.

According to a possible embodiment of the processing unit, the processing unit is configured to determine the total number of positioning satellites from which the satellite signal receiving element can currently receive signals; when the number is zero, the processing unit determines that the vehicle is in an environment where the ventilation state is not good; and when the number is not zero, the processing unit judges whether the vehicle is in an environment where the ventilation state is not good based on the vehicle location information received from the positioning satellite under the assistant of an electric map.

According to a possible embodiment of the processing unit, the engine operation state acquisition module comprises a CAN bus interface which is adapted to be connected with a CAN bus of the vehicle for acquiring information of the operation state of the vehicle engine.

According to a possible embodiment of the processing unit, the vehicle running state acquisition module comprises an ESP interface, an ABS interface or a CAN bus interface which is adapted to be connected with an ESP, an ABS or a CAN bus of the vehicle for acquiring information of the running state of the vehicle.

According to a possible embodiment of the processing unit, the air conditioner operation state acquisition module comprises an air conditioner control unit interface which is adapted to be connected with an air conditioner control unit, or comprises an air conditioner switch.

According to a possible embodiment of the processing unit, the door/window opening/closing state acquisition module comprises an LIN interface which is adapted to be connected with an LIN system of the vehicle for obtaining information of opening/closing states of the doors and windows of the vehicle.

The disclosure in another aspect provides a vehicle air conditioner warning device, which comprises a processing unit for vehicle air conditioner warning as described above, and a satellite signal receiving element and a warning element, both connected with the processing unit, wherein, when the processing units determines that there is a potential risk of poisoning resulted from a running vehicle air conditioner, the processing unit sends an instruction to the warning element so that the warning element sends out a warning signal.

According to a possible embodiment of the vehicle air conditioner warning device, when the processing units determines that there is a potential risk of poisoning resulted from a running vehicle air conditioner, the processing unit sends out an instruction after a delay time, for example, 3 to 5 minutes.

According to a possible embodiment of the vehicle air conditioner warning device, the warning element comprises an audio and/or video and/or vibration signal generator.

According to a possible embodiment of the vehicle air conditioner warning device, the processing unit is adapted to forcibly open one or more windows of the vehicle when it determines there is a potential risk of poisoning when the air conditioner is being used.

The disclosure in yet another aspect provides a vehicle air conditioner warning method, which is performed preferably by the processing unit as described above or by the vehicle air conditioner warning device as described above, the method comprising the steps of: acquiring information about a ventilation state of the current vehicle location, an operation state of the vehicle engine, a running state of the vehicle, a using state of the air conditioner and a vehicle door/window opening/closing state, wherein the ventilation state at the current vehicle location is judged based on positioning satellite signals; determining whether there is a risk of poisoning when the air conditioner is being used, wherein the risk of poisoning is determined when all the following conditions are met: the ventilation state at the current vehicle location is bad, the engine is in operation, the vehicle is in a stopped state or runs at a low speed, the air conditioner is being used, and all the doors and windows of the vehicle are closed; and sending out a warning signal.

According to a possible embodiment of the vehicle air conditioner warning method, the running state of the vehicle is judged based on one or more further factors of: whether the engine is in an idle state, the braking state of the vehicle, and the current gear of the transmission of the vehicle.

According to the disclosure, it judges whether there is a risk of poisoning when the vehicle air conditioner is used based on positioning satellite signals and information related with the states of the vehicle, without needing any carbon oxide sensor to be added. Thus, problems of high cost and short life time related with carbon oxide sensors can be avoided.

BRIEF DESCRIPTION OF THE DRAWINGS

The foregoing and other aspects of the disclosure will be understood and appreciated more fully from the following detailed description taken in conjunction with the drawings, in which.

DETAILED DESCRIPTION OF THE PREFERRED EMBODIMENTS

The disclosure is based on the understanding that there is a potential risk when the vehicle air conditioner is used. Specifically, when the vehicle engine is running, the vehicle exhaust will be gathered around the vehicle if the environmental ventilation condition is not good. In this condition, if the vehicle air conditioner is used while the vehicle doors and windows are all closed, the vehicle exhaust will be drawn into the vehicle cabin, so the concentration of harmful components in the exhaust in the cabin is increased, which has negative effects to the health of persons in the cabin.

When the engine runs at a low speed, the amount of the discharged carbon oxide increases rapidly. Thus, when the vehicle is in a stopped state or runs at a low speed in an environment where ventilation condition is not good, such as a garage, especially an underground garage, or a tunnel, if the air conditioner is used while the vehicle doors and windows are closed tightly, carbon oxide will be drawn into and gathered in the vehicle cabin. Test results indicate that, in a short period of time, for example, in about only more than ten minutes, the concentration of carbon oxide in the cabin may be increased to a level which causes coma or death of persons in the cabin.

It is noted that, for most vehicle air conditioners, they can be activated only when the engine is running. However, for some other air conditioners, they can operate only if the energy of the vehicle battery is available. Thus, the state that there is a potential risk of poisoning when the vehicle air conditioner is used, as concerned by the disclosure, occurs when all the following conditions are met: the vehicle air conditioner is running, the engine is in operation (especially operation at a low speed, for example, an idle speed), the ventilation state at the current vehicle location is bad, and the vehicle doors and windows are all closed tightly. When the state that there may be a risk of poisoning when the vehicle air conditioner is used is determined, persons in the vehicle cabin are warned.

According to a basic concept of the disclosure, signals from satellite positioning systems are utilized for judging the ventilation state at the current vehicle location.

Figure 1:
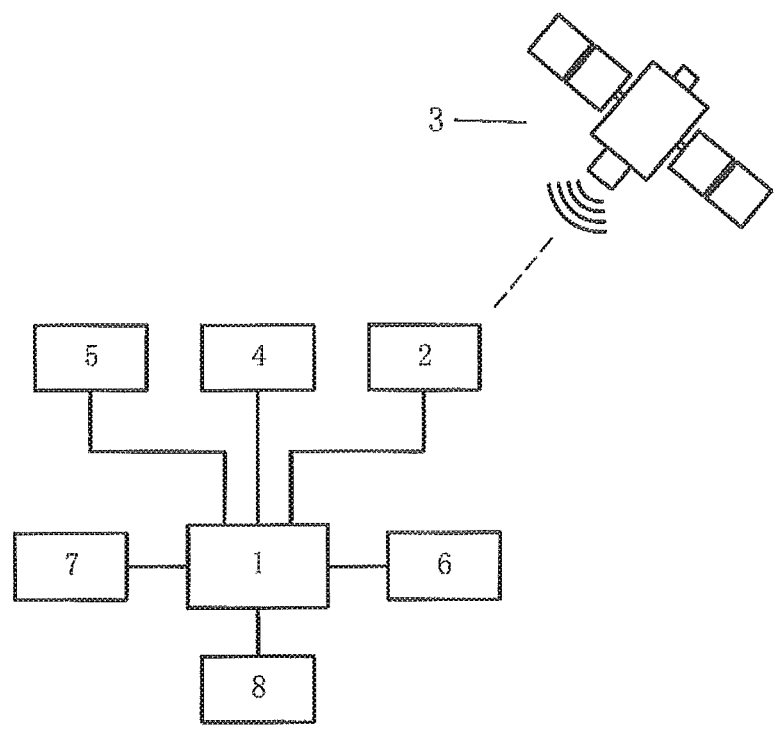
FIG. 1 is a schematic block view of basic components of a vehicle air conditioner warning device according to the disclosure.

According to the disclosure, there provides a vehicle air conditioner warning device as schematically shown in FIG. 1, the vehicle air conditioner warning device mainly comprising: a processing unit 1 for vehicle air conditioner warning; a satellite signal receiving element 2 connected with the processing unit 1 and being able to receive positioning information of the vehicle from various positioning satellites 3 and send the positioning information of the vehicle to the processing unit 1; an engine operation state acquisition module 4 connected with the processing unit 1 and configured to send the information of the operation state of the vehicle engine to the processing unit 1; a vehicle running state acquisition module 5 connected with the processing unit 1 and configured to send the information of the running state of the vehicle to the processing unit 1; an air conditioner operation state acquisition module 6 connected with the processing unit 1 and configured to send the information of the using state of the air conditioner to the processing unit 1; a door/window opening/closing state acquisition module 7 connected with the processing unit 1 and configured to send the information of the door/window opening/closing state to the processing unit 1; and a warning element 8 connected with the processing unit 1 and configured to send out warning in responsive to a command from the processing unit 1 to indicate there is a potential risk of poisoning when the air conditioner is being used.

The satellite signal receiving element 2 may be a portion of a vehicle navigation system, and can receive positioning signals from one or more positioning satellites (such as GPS, BEIDOU Navigation Satellite System, etc.). The processing unit 1 determines the total number of positioning satellites from which it can receive signals at the current location based on the quality of the positioning signals received by the satellite signal receiving element 2. The processing unit 1 may substantially determine that the vehicle is in a location where satellite signals are weak if the number of positioning satellites the signals of which can be received at the current vehicle location is zero, such a location generally being in a shielded, closed or partially closed site where air flowability is low, that is to say, the ventilation state at the current vehicle location is bad.

On the other hand, if the number of positioning satellites the signals of which can be received at the current vehicle location is greater than zero, the processing unit 1 determines the location of the vehicle by the help of the vehicle navigation system and then matches the vehicle location with a point in an electric map of the vehicle navigation system to determine the property of the vehicle location. When it determines that the vehicle is at an open site, such as road, street, etc., the processing unit 1 generally judges that the air flowability around the vehicle is high; and when it determines that the vehicle is in a narrow space, for example, in a building, the processing unit 1 generally judges that the air flowability around the vehicle is low, that is to say, the ventilation state at the current vehicle location is bad.

The engine operation state acquisition module 4 is configured to sense whether the engine is in operation, possibly also sense the speed of the engine. The engine operation state acquisition module 4 may be a CAN bus interface in the form of hardware or software since the operation state of the vehicle engine can be obtained from a CAN bus of the vehicle.

The vehicle running state acquisition module 5 is configured to sense the running state of the vehicle (running or stopping, running speed, etc.). The running state of the vehicle can be derived from the movement state of vehicle wheels, while the movement state of vehicle wheels can be obtained from an ESP/ABS of the vehicle, or from the CAN bus. Thus, the vehicle running state acquisition module 5 may be an ESP/ABS interface or CAN bus interface in the form of hardware or software. The engine operation state acquisition module 4 and the vehicle running state acquisition module 5 may be configured to be the same CAN bus interface.

The air conditioner operation state acquisition module 6 is configured to sense whether the vehicle air conditioner is being used. The using state of the air conditioner can be obtained from an air conditioner control unit of the vehicle, and thus the air conditioner operation state acquisition module 6 may be an air conditioner control unit interface in the form of hardware or software. Alternatively, the air conditioner operation state acquisition module 6 may be formed by an air conditioner switch, so the using state of the air conditioner can be determined on the basis of the ON/OFF state of the air conditioner switch.

The door/window opening/closing state acquisition module 7 is configured to sense the opening/closing state of the doors and windows of the vehicle. The opening/closing state of the doors and windows of the vehicle can be obtained from an LIN system of the vehicle, and thus the door/window opening/closing state acquisition module 7 may be a vehicle LIN interface.

The processing unit 1 receives signals from the satellite signal receiving element 2, the engine operation state acquisition module 4, the vehicle running state acquisition module 5, the air conditioner operation state acquisition module 6, the door/window opening/closing state acquisition module 7 to determine the ventilation state at the current vehicle location, the operation state of the vehicle engine, the running state of the vehicle, the using state of the air conditioner and the vehicle door/window opening/closing state, and determines that there is a potential risk of poisoning when the air conditioner is being used if all the following conditions are met: the ventilation state at the current vehicle location is bad, the engine is in operation, the vehicle is in a stopped state or runs at a low speed, the air conditioner is being used (especially having been used for more than a certain period of time), and all the doors and windows of the vehicle are closed.

As to the running state of the vehicle, the following factors may be considered as assistant or alternative judging basis: the engine being running at idle speed, the vehicle being in a braked state, the gear of the transmission of the vehicle being parking or neutral, etc.

When it determines there is a potential risk of poisoning when the air conditioner is being used, the processing unit 1 may send an instruction to the warning element 8 to initiate the warning element 8 to sending out a warning to persons in the vehicle to open a door or window or to switch off the air conditioner. Of course, the processing unit 1 may be set to wait a small period of time, for example, 3 to 5 minutes, after it determines there is a potential risk of poisoning when the air conditioner is being used; and then instruct the warning element 8 to send out warning if the risk condition does not disappear after this delay time.

The warning element 8 is preferably in the form of an audio one, which may be provided as an individual element, or may be incorporated in sound equipment of the vehicle. Additionally or alternatively, the warning element 8 may be a video element, or even a vibration element incorporated in a vehicle seat.

As a possible embodiment, the processing unit 1 may be set to forcibly open one or more windows of the vehicle (directly controls the opening of the window, or controls the opening of the window via an ECU of the vehicle) after it determines there is a potential risk of poisoning when the air conditioner is being used.

The processing unit 1 may be configured to be a micro processor for receiving corresponding information about the above described states, determining whether there is a potential risk of poisoning when the air conditioner is being used, and sending a warning instruction. Such a micro processor is within the scope of the disclosure. The micro processor may be in communication with the vehicle ECU, or integrated into the vehicle ECU.

Further, in the embodiments described above, the processing unit is connected with the engine operation state acquisition module, the vehicle running state acquisition module, the air conditioner operation state acquisition module and the door/window opening/closing state acquisition module. However, according to a variant of the disclosure, the engine operation state acquisition module, the vehicle running state acquisition module, the air conditioner operation state acquisition module and the door/window opening/closing state acquisition module may be integrated in the processing unit.

The disclosure in another aspect provides a vehicle air conditioner warning method, which is particularly suitable to be applied in combination with the processing unit for vehicle air conditioner warning or the vehicle air conditioner warning device as described above.

Figure 2:
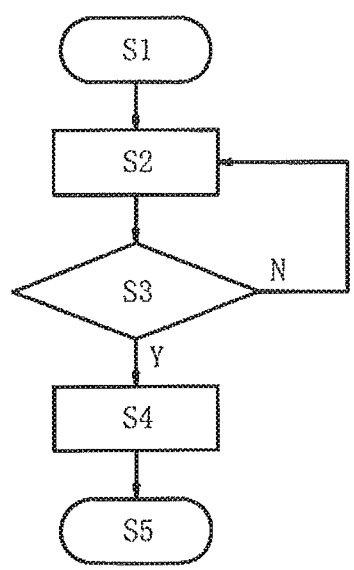
FIG. 2 is a flow chart of a vehicle air conditioner warning method according to the disclosure.

In general, the vehicle air conditioner warning method of the disclosure comprises the following steps which are shown in FIG. 2 and to be conducted in sequence:

In Step S1, the vehicle air conditioner warning procedure of the disclosure is started. The vehicle air conditioner warning procedure may be triggered by the activating (switch on) of the vehicle air conditioner.

In Step S2, the following states of the vehicle are obtained and judged (for example, by means of the above described processing unit 1 under the help of the satellite signal receiving element 2, the engine operation state acquisition module 4, the vehicle running state acquisition module 5, the air conditioner operation state acquisition module 6 and the door/window opening/closing state acquisition module 7): the ventilation state at the current vehicle location, the operation state of the vehicle engine, the running state of the vehicle, the using state of the air conditioner, and the vehicle door/window opening/closing state, wherein the ventilation state at the current vehicle location is determined based on signals of positioning satellites.

In Step S3, it judges whether there is a risk of poisoning when the air conditioner is being used (for example, by means of the above described processing unit 1), wherein it determines there is a potential risk of poisoning when the air conditioner is being used when all the following conditions are met: the ventilation state at the current vehicle location is bad, the engine is in operation, the vehicle is in a stopped state or runs at a low speed (for example, idle state of the engine), the air conditioner is being used (especially having been used for more than a certain period of time), and all the doors and windows of the vehicle are closed. The procedure goes to Step S4 (possible after a delay time) if ii determines in Step S3 that there is a potential risk of poisoning when the air conditioner is being used; on the other hand, the procedure goes to Step S2 if it determines in Step S3 that there is no risk when the air conditioner is being used.

In Step S4, a warning signal is sent out (for example, by means of the above described warning element 8, under the instruction from the processing unit 1) to warn persons in the vehicle to open one of the vehicle doors or windows, and possibly to warn them to turn off the air conditioner. In addition, a vehicle door or window may be opened forcibly.

In Step S5, the vehicle air conditioner warning procedure of the disclosure is ended.

It should be noted that the obtaining and judging of various states in Step S2 can be done at times different from each other. As an example, in a concrete embodiment of the vehicle air conditioner warning method according to the disclosure as shown in FIG. 3, Step S2 is divided into several substeps.

Figure 3:
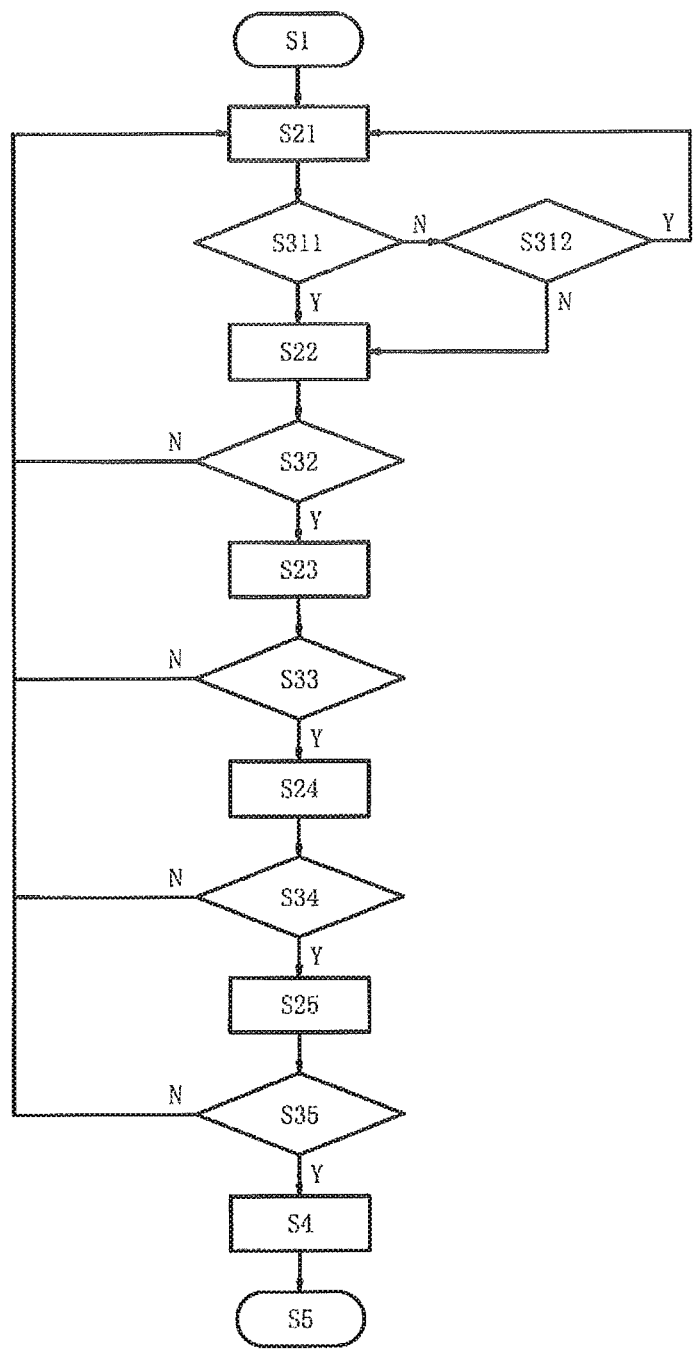
FIG. 3 is a flow chart of a concrete embodiment of the vehicle air conditioner warning method according to the disclosure.

Specifically, in the method shown in FIG. 3, the following steps will be conducted in sequence:

In Step S1, the vehicle air conditioner warning procedure of the disclosure is started.

In Step S21, it obtains the total number of positioning satellites from which the vehicle can receive signals at the current location (for example, by means of the above described satellite signal receiving element 2).

In Step S311, it judges whether the number of positioning satellites from which the vehicle can receive signals at the current location is zero (for example, by means of the above described processing unit 1); the procedure goes to Step S22 if the number is zero; on the other hand, the procedure goes to Step S312 if the number is not zero.

In Step S312, the vehicle location obtained from the positioning satellites is matched with a point in an electric map in a vehicle navigation system to judge whether the vehicle location is at a site where air flowability is high; the procedure returns to Step S21 if it judges out that vehicle is at a site where air flowability is high (such as on road, street or other open area); on the other hand, the procedure goes to Step S22 if it judges out that vehicle is at a site where air flowability is low (like a narrow space), for example, in a building.

In Step S22, the operation state of the vehicle engine (for example, by means of the above described engine operation state acquisition module 4) is obtained, which information may come from a vehicle CAN bus.

In Step S32, it judges whether the engine is in operation; the procedure returns to Step S21 if it judges out that the engine is in operation; on the other hand, the procedure goes to Step S23 if it judges out that the engine is not in operation.

In Step S23, the running state of the vehicle (for example, by means of the above described vehicle running state acquisition module 5) is obtained, which information may come from a vehicle ESP/ABS, or from a vehicle CAN bus.

In Step S33, it judges whether the vehicle is stopped or runs at a low speed (for example, by means of the above described vehicle running state acquisition module 5); the procedure returns to Step S21 if it judges out that vehicle is normally running (for example, the speed of the vehicle is higher than a predetermined value), not stopped or running at a low speed; on the other hand, the procedure goes to Step S24 if it judges out that the vehicle is in a stopped state or runs at a low speed (for example, the speed of the vehicle is lower than a predetermined value; the judge may also be conducted on the basis of whether the vehicle is in an idle state, whether the vehicle is a braked state, and whether the current gear of the transmission of the vehicle is parking or neutral, etc.).

In Step S24, the running state of the vehicle air conditioner (for example, by means of the above described air conditioner operation state acquisition module 6) is obtained, which information may come from an air conditioner control unit, an air conditioner switch, etc.

In Step S34, it judges whether the vehicle air conditioner is being used; the procedure returns to Step S21 if it judges out that the air conditioner is not being used; on the other hand, the procedure goes to Step S25 if it judges out that the air conditioner is being used.

In Step S25, the vehicle door/window opening/closing state (for example, by means of the above described door/window opening/closing state acquisition module 7) is obtained, which information may come from a vehicle LIN system.

In Step S35, it judges whether all the vehicle doors or windows are closed; the procedure returns to Step S21 if it judges out that not all the vehicle doors or windows are closed; on the other hand, the procedure goes to Step S4 if it judges out that all the vehicle doors or windows are closed.

In Step S4, a warning signal is sent out, as described above.

In Step S5, the vehicle air conditioner warning procedure of the disclosure is ended.

It is appreciated that it is not necessary to conduct the obtaining and judging of the ventilation state at the current vehicle location (Steps S21, S311, S312), the obtaining and judging of the operation state of the vehicle engine (Steps S22, S32), the obtaining and judging of the running state of the vehicle (Steps S23, S33), the obtaining and judging of the using state of the air conditioner (Steps S24, S34) and the obtaining and judging of the vehicle door/window opening/closing state (Steps S25, S35) in the sequence shown in FIG. 3; rather, the sequence of them can be adjusted according to real requirements. For example, the obtaining and judging of the using state of the air conditioner can be conducted first, and then other obtaining and judging steps can be conducted. In addition, the obtaining and judging steps for some states can be conducted synchronously, rather than in sequence.

According to the disclosure described here, it determines whether there is a risk of poisoning when the vehicle air conditioner is used based on signals from positioning satellites and information related with vehicle states, without needing to add a carbon oxide sensor, so the potential risk of poisoning when the vehicle air conditioner is used can be warned of at a lower cost. Further, the problem of short life time of the carbon oxide sensor of the prior art does not exist in the vehicle air conditioner warning device of the disclosure, so the service time of the whole warning device can be prolonged.

While the disclosure is illustrated and described here with reference to specific embodiments, the disclosure is not intended to be limited to the details shown. Rather, various modifications may be made to the details within the scope of the disclosure.

The invention claimed is:

1. A system for detection of elevated levels of poisonous gas around a motor vehicle comprising:
   an air conditioner in the motor vehicle;
   an engine in the motor vehicle;
   a warning element in the motor vehicle;
   a satellite signal receiving element in the motor vehicle; and
   a processing unit in the motor vehicle operatively connected to the air conditioner, the engine, the warning element, and the satellite signal receiver, the processing unit comprising:
   a processor configured to:
      determine a ventilation state of a current location of the vehicle based on positioning satellite signals received by a satellite signal receiving element;
      determine whether an engine of the vehicle is in operation based on information received by an engine operation state acquisition module;
      determine whether the vehicle is at least one of in a stopped state and running at a low speed based on information received by a vehicle running state acquisition module;
      determine whether the air conditioner is being used based on information received by a air conditioner operation state acquisition module;
      determine whether all of the doors and windows of the vehicle are closed based on information received by a door/window opening/closing state acquisition module; and
      determine a potential risk of poisoning without use of a gas sensor when the air conditioner is being used and initiate the warning element when all the following conditions are met:
         the ventilation state at the current location of the vehicle is bad,
         the engine is in operation,
         the vehicle is in at least one of the stopped state and running at the low speed,
         the air conditioner is being used, and
         all the doors and windows of the vehicle are closed.

2. The processing unit of claim 1, the processor being further configured to:
   determine a total number of positioning satellites from which the satellite signal receiving element can currently receive signals;
   when the total number of positioning satellites is zero, determine that the vehicle is in an environment where the ventilation state is bad; and
   when the total number of positioning satellites is not zero, determine whether the vehicle is in an environment where the ventilation state is bad based on vehicle location information received from the positioning satellite under with the assistance of an electric map.

3. The processing unit of claim 1, wherein the engine operation state acquisition module comprises a CAN bus interface configured to connect to a CAN bus of the vehicle to acquire information regarding whether the engine is in operation.

4. The processing unit of claim 1, wherein the vehicle running state acquisition module comprises at least one of an ESP interface, an ABS interface and a CAN bus interface configured to connect to at least one of an ESP, an ABS and a CAN bus of the vehicle to acquire information regarding whether the vehicle is at least one of in the stopped state and running at the low speed.

5. The processing unit of claim 1, wherein the air conditioner operation state acquisition module comprises at least one of (i) an air conditioner control unit interface configured to connect to an air conditioner control unit, and (ii) an air conditioner switch.

6. The processing unit of claim 1, wherein the door/window opening/closing state acquisition module comprises an LIN interface configured to connect to an LIN system of the vehicle to obtain information regarding whether all of the doors and windows are closed.

7. An air conditioner warning device of a vehicle comprising:
   a processing unit having a processor, the processor being configured to (i) determine a ventilation state of a current location of the vehicle based on positioning satellite signals received by a satellite signal receiving element, (ii) determine whether an engine of the vehicle is in operation based on information received by a engine operation state acquisition module, (iii) determine whether the vehicle is at least one of in a stopped state and running at a low speed based on information received by a vehicle running state acquisition module, (iv) determine whether the air conditioner is being used based on information received by a air conditioner operation state acquisition module, (v) determine whether all of the doors and windows of the vehicle are closed based on information received by a door/window opening/closing state acquisition module, and (vi) determine a potential risk of poisoning without use of a gas sensor when the air conditioner is being used and initiate a warning element when all the following conditions are met: the ventilation state at the current location of the vehicle is bad, the engine is in operation, the vehicle is at least one of in the stopped state and running at the low speed, the air conditioner is being used, and all the doors and windows of the vehicle are closed;
   a satellite signal receiving element connected to the processing unit; and
   a warning element, connected with the processing unit and configured to send out a warning signal,
   wherein, when the processor determines a potential risk of poisoning resulted from a running air conditioner of the vehicle, the processing unit sends an instruction to the warning element to sends out the warning signal.

8. The vehicle air conditioner warning device of claim 7, wherein:
   the warning element comprises at least one of an audio signal generator, a video signal generator, and a vibration signal generator; and
   the processing unit is configured to forcibly open at least one window of the vehicle in response to determining a potential risk of poisoning when the air conditioner is being used.

9. A vehicle air conditioner warning method, comprising the steps of:
   acquiring information about a ventilation state of a current location of the vehicle, whether an engine of the vehicle is in operation, whether the vehicle is at least one of in a stopped state and running at a low speed, whether the air conditioner of the vehicle is being used, and whether all of the doors and windows of the vehicle are closed, the ventilation state being determined based on positioning satellite signals;

determining whether there is a risk of poisoning when the air conditioner is being used, the risk of poisoning being determined without use of a gas sensor when all the following conditions are met: the ventilation state at the current location of the vehicle is bad, the engine is in operation, the vehicle is at least one of in the stopped state and running at the low speed, the air conditioner is being used, and all the doors and windows of the vehicle are closed; and sending out a warning signal in response to determining a potential risk of poisoning when the air conditioner is being used.

10. The vehicle air conditioner warning method of claim 9, wherein the running state of the vehicle is determined based on at least one of the following factors: whether the engine is in an idle state, a braking state of the vehicle, and the current gear of a transmission of the vehicle.

* * * * *

UNITED STATES PATENT AND TRADEMARK OFFICE
CERTIFICATE OF CORRECTION

| | | |
|---|---|---|
| PATENT NO. | : 9,783,023 B2 | Page 1 of 1 |
| APPLICATION NO. | : 14/959110 | |
| DATED | : October 17, 2017 | |
| INVENTOR(S) | : Jian An | |

It is certified that error appears in the above-identified patent and that said Letters Patent is hereby corrected as shown below:

On the Title Page

The following Foreign Patent Document listed under the References Cited section (item (56)) should read:

(56) References Cited
FOREIGN PATENT DOCUMENTS
DE     10320745 A1    12/2004

Signed and Sealed this
First Day of May, 2018

Andrei Iancu
*Director of the United States Patent and Trademark Office*